Patented June 11, 1946

2,401,959

UNITED STATES PATENT OFFICE 2,401,959

POLYMERIZATION OF METHALLYL ALCOHOL

Harry Fred Pfann and Edward L. Kropa, Old Greenwich, Conn., assignors to American Cyanamid Company, New York, N. Y., a corporation of Maine No Drawing. Application October 4, 1941, Serial No. 413,685

1 Claim. (Cl. 260—80)

This invention relates to the polymerization of methallyl alcohol at elevated temperatures by the action of oxygen.

We have found that methallyl alcohol, which has the formula

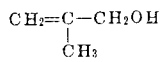

can be polymerized at elevated temperatures of at least 85° C. and preferably within the range of about 85–185° C. to yield a polymer having many of the properties of a polyhydric alcohol.

In carrying out the process of our invention methallyl alcohol is subjected to the action of oxygen at elevated temperatures. By "oxygen" we mean substantially pure oxygen, as we have found that the simple aeration of methallyl alcohol at elevated temperatures either does not yield a polymer or the polymerization takes place so slowly as to avoid detection by ordinary laboratory procedure within a reasonable period of time.

We prefer to carry out the polymerization of methallyl alcohol in the presence of oxygen at elevated temperatures between 85° C. and its boiling point, since the reaction proceeds more rapidly under these conditions. When temperatures above the normal boiling point of methallyl alcohol are employed the polymeriztion should of course be carried out in a pressure vessel. However, methallyl alcohol boils at 114° C. under ordinary atmospheric pressure, and we have found that in the presence of substantially pure oxygen this is a satisfactory polymerization temperature. Accordingly, the polymerization may be carried out by blowing oxygen through the alcohol heated to its refluxing temperature.

A further increase in the rate of polymerization of methallyl alcohol by oxygen may be obtained by the use of suitable catalysts. We have found, for example, that dimethallyl ether or diallyl ether may be used to reduce considerably the induction period which precedes oxygen take-up when operating at high temperatures, and particularly when operating under pressure in an autoclave. Peroxides such as tertiary butyl hydroperoxide, cobalt salts, $NO_2$, methacrolein and methacrylic acid may also be employed as catalysts for the polymerization, and methacrolein or methacrylic acid may be present in sufficiently large quantities not only to exert a catalytic effect but also to bring about copolymerization. Copolymerization of methallyl alcohol in admixture with its esters with lower and higher monocarboxylic acids may also be accomplished by the process of the invention.

The methallyl alcohol to be used in our process should be free of anti-oxidants, such as hydroquinone or other inhibitors which may have developed during its manufacture or on standing or which may have been added to the alcohol. When freshly prepared the methallyl alcohol may be employed directly for polymerization with oxygen by the process of our invention, but when the presence of a polymerization inhibitor is known or expected to exist the alcohol should first be purified. Suitable purification steps include simple distillation of the alcohol or preferably distillation after addition of a strong alkali such as sodium hydroxide, potassium hydroxide or calcium oxide.

The products obtained by the polymerization of methallyl alcohol with oxygen at elevated temperatures are complex in character and it is not feasible to define their constitution by structural formulae. We believe that the polymerization products are polyhydric alcohols, since they have fairly high hydroxyl numbers and combine with organic polycarboxylic acids such as phthalic acid or anhydride, maleic acid, tricarballylic acid, succinic acid and the like to yield products having the properties of alkyd resins. However, the exact nature of the product is dependent largely upon the extent to which the oxygen reaction has been carried, and frequently the products obtained by extensive polymerization in the presence of oxygen at elevated temperatures show some of the properties of an organic carboxylic acid. In fact, typical products prepared by the process of our invention show small acid numbers, ester numbers and saponification numbers which indicate the presence of small amounts of acid and ester and other complex structures in the polymeric material. On the basis of the iodine values and hydroxyl numbers of typical polymerization products obtained by the process of our invention we estimate that the product has a degree of polymerization of at least 3 molecules of approximately the same molecular weight as methallyl alcohol, and further confirmation of this assumption is based upon the ease with which the polymer is esterified with higher fatty acids to yield products resembling glyceride oils.

The reaction mixture obtained by heating methallyl alcohol in the presence of oxygen, with or without polymerization catalysts, may be subjected to further treatment to remove unreacted monomeric methallyl alcohol, methacrylic acid, methacrolein and the like if desired. These undesired substances may be removed by washing the polymer with water having dissolved therein a small amount of sodium dioctyl sulfosuccinate or by washing with some other solvent in which they are soluble but in which the polymethallyl alcohol is insoluble. Most of these materials can also be removed by volatilization by heating the polymer under a vacuum of a few millimeters pressure, or by blowing steam through the mixture or both. This latter procedure tends to hydrolyze the ester groups in the polymer and this hydrolysis may be facilitated if desired by first adding an aqueous solution of an alkali such as sodium hydroxide to the polymerization product.

The polymethallyl alcohols prepared by the process of our invention are transparent, brown to colorless materials which may vary in nature from thin syrupy balsams to thermoplastic solids depending upon the degree of polymerization. They are soluble in alcohols such as methyl, ethyl, and butyl alcohol and in alcohol-water mixtures, but are insoluble in water. They may be esterified with lower fatty acids or their anhydrides such as formic, acetic, propionic or butyric acids or with higher fatty acids such as lauric, myristic, stearic, oleic, oleostearic, or in general with any of the fatty acids or fatty acid mixtures obtainable by the hydrolysis of animal fats or vegetable oils such as palm oil, coconut oil, soya bean oil, linseed oil, tung oil and the like. Similarly, they may be esterified with abietic acid, rosin or hydrogenated rosin, benzoic acid or other monocarboxylic acids. Upon reaction with organic dicarboxylic acids such as phthalic acid, succinic acid, maleic acid, fumaric acid, sebacic acid and the like they form esters that are easily polymerized to alkyd resins, and they are well adapted for the formation of oil-acid modified alkyd resins of the drying or non-drying type by reacting together one or more moles of the polymerized polymethallyl alcohol with one or more moles of one of the above-mentioned organic dicarboxylic acids such as phthalic acid and its anhydride and with one, two, three or four moles of a higher fatty acid such as stearic acid, oleic acid, linoleic acid, mixed fatty acids obtained from the hydrolysis of linseed oil, dehydrated castor oil and the like. Esters of polymethallyl alcohols obtained by the process of our invention with the lower fatty acids mentioned above are compatible with nitrocellulose, cellulose acetate and other cellulose esters and cellulose ethers as well as with rubber hydrochloride and may be used as plasticizers therefor.

The invention will be described in greater detail with reference to the following specific examples. It should be understood, however, that these examples are given merely by way of illustration and that the invention in its broader aspects is not limited thereto but should be construed broadly within the scope of the appended claim.

Example 1

A small amount of solid sodium hydroxide was added to a quantity of methallyl alcohol which was then distilled. 685 parts by weight of the distilled methallyl alcohol were then placed in a reaction vessel equipped with a gas diffusing plate in its lower portion and with a reflux condenser. The alcohol was heated at its boiling point for a total of three days during which time a stream of finely divided oxygen was passed through it. After this time the material had developed a yellow color, gave a peroxide test with potassium iodide, and upon removal of the monomeric alcohol by distillation at reduced pressure there remained 220 parts of a yellow balsam free of the original odor of the alcohol and having a hydroxyl number of 412.

60 parts by weight of the polymethallyl alcohol were mixed with 100 parts of acetic anhydride and the mixture was heated at 100° C. for one hour. The resulting solution was allowed to stand for 3 days, the excess acetic anhydride and acid were removed by evaporation at 10–20 mm. of mercury pressure and the ester was obtained as a tan-colored balsam of considerably lower viscosity than the alcohol from which it was prepared.

Example 2

320 parts of a mixture of equal parts by weight of methallyl acetate and distilled methallyl alcohol were heated to reflux in the reaction vessel described in Example 1 while passing a stream of oxygen through the mixture. The heating was continued for several days during which time the vapor temperature rose as follows:

| Days heated | Vapor temp. °C. |
|---|---|
| Start | 112 |
| 2 | 119 |
| 4 | 124 |
| 5 | 130 |

After five days heating the reaction product was an amber, viscous mass which when freed of volatile material by distillation at reduced pressure left 135 parts of a residue having an acid number of 113 and a saponification number of 385.8.

Example 3

50 parts by volume of methallyl alcohol, purified by distillation from sodium hydroxide, were charged into a pressure vessel provided with heating coils and oxygen was introduced to a pressure of 100 lbs. per square inch gage. The vessel and its contents were then heated at 100° C. and the progress of the reaction was followed by measuring the oxygen absorption as indicated by the pressure drop.

An induction period of 20–30 minutes at 100° C. was noted, during which time there was no significant change in the pressure. This was followed by a gradual pressure drop to 50 lbs. gage pressure in about 50 minutes. At this point further oxygen was introduced to a total pressure of 100 lbs. gage and the heating was continued for a total of eleven hours, after which time a product was obtained similar to that described in Example 1.

Another run was made using commercial methallyl alcohol purified by distillation in the absence of an alkali. In this run the induction period was 60–70 minutes and the absorption rate was slower. However, it was found that this disadvantage could be overcome by frequently or continuously supplying the autoclave with oxygen under 100 lbs. pressure, and the final product was substantially the same.

Example 4

A mixture containing 96% of alkali-purified methallyl alcohol and 4% of diallyl ether was heated with oxygen under 100 lbs. gage pressure at 100° C. as described in Example 3. The catalyst was found to shorten the induction period to 10-15 minutes and also to increase the rate of oxygen absorption, and a product containing 30% of polymethallyl alcohol was obtained in less than 6.5 hours.

What we claim is:

A method of polymerizing methallyl alcohol which comprises distilling commercial methallyl alcohol over a strong alkali and then subjecting the distilled alcohol to the action of substantially pure oxygen at elevated temperatures of at about 85-185° C. until substantial proportions of the alcohol have been polymerized.

HARRY F. PFANN.
EDWARD L. KROPA.